US012578701B2

(12) United States Patent (10) Patent No.: US 12,578,701 B2
Mccutcheon et al. (45) Date of Patent: Mar. 17, 2026

(54) LATTICE STRUCTURES WITH IDENTIFIABLE PATTERNS

(71) Applicant: Peridot Print LLC, Palo Alto, CA (US)

(72) Inventors: James Andrew Mccutcheon, Vancouver, WA (US); David Christopher Woodlock, Vancouver, WA (US)

(73) Assignee: Peridot Print LLC, Palo Alto, CA (US)

( * ) Notice: Subject to any disclaimer, the term of this patent is extended or adjusted under 35 U.S.C. 154(b) by 150 days.

(21) Appl. No.: 17/910,286

(22) PCT Filed: Jul. 7, 2020

(86) PCT No.: PCT/US2020/041037
§ 371 (c)(1),
(2) Date: Sep. 8, 2022

(87) PCT Pub. No.: WO2022/010460
PCT Pub. Date: Jan. 13, 2022

(65) Prior Publication Data
US 2023/0139651 A1 May 4, 2023

(51) Int. Cl.
*G05B 19/4099* (2006.01)
*B29C 64/393* (2017.01)
(Continued)

(52) U.S. Cl.
CPC ........ *G05B 19/4099* (2013.01); *B29C 64/393* (2017.08); *B33Y 10/00* (2014.12);
(Continued)

(58) Field of Classification Search
None
See application file for complete search history.

(56) References Cited

U.S. PATENT DOCUMENTS 6,409,615 B1 * 6/2002 McGuire ............ A63B 37/0009
                                                473/383
9,922,392 B2 3/2018 Rolland-Neviere et al.
(Continued)

FOREIGN PATENT DOCUMENTS

CN      106485642 A      3/2017
CN      109934936 A      6/2019
(Continued)

*Primary Examiner* — Ryan A Jarrett
(74) *Attorney, Agent, or Firm* — Michael Dryja

(57) ABSTRACT

According to examples, an apparatus may include a processor that may identify a pattern to be visible in a portion of a lattice structure, determine a first zone in a digital model of the lattice structure corresponding to the identified pattern, and determine a second zone in the digital model corresponding to a location outside of the first zone. The processor may also arrange a plurality of seeds at a first density level in the first zone, arrange a plurality of seeds at a second density level in the second zone, and grow cells from the plurality of seeds to form the lattice structure in the digital model. The cells may grow until edges of the cells contact edges of neighboring cells to form cells at a different density level in the first zone than the second zone to cause the identified pattern to be visible from the cells.

13 Claims, 6 Drawing Sheets

(51) Int. Cl.
   *B33Y 10/00*          (2015.01)
   *B33Y 30/00*          (2015.01)
   *B33Y 50/02*          (2015.01)
   *B33Y 80/00*          (2015.01)

(52) U.S. Cl.
   CPC .............. *B33Y 30/00* (2014.12); *B33Y 50/02*
            (2014.12); *B33Y 80/00* (2014.12); *G05B*
                              *2219/35012* (2013.01)

(56)                    References Cited

U.S. PATENT DOCUMENTS

| | | | |
|---|---|---|---|
| 10,363,703 B2 | 7/2019 | Banadyga et al. | |
| 10,628,905 B2 | 4/2020 | Cook et al. | |
| 2019/0205499 A1* | 7/2019 | De Lange | .............. B33Y 50/00 |
| 2021/0252356 A1* | 8/2021 | Thurman | ............... A63B 59/42 |
| 2022/0142284 A1* | 5/2022 | Laperriere | ............ A42C 2/002 |
| 2022/0253576 A1* | 8/2022 | Musuvathy | ........... B29C 64/393 |

FOREIGN PATENT DOCUMENTS

| | | |
|---|---|---|
| JP | 2019-130579 A | 8/2019 |
| WO | 2017/139033 A1 | 8/2017 |

* cited by examiner

APPARATUS
100

MEMORY
110

IDENTIFY A PATTERN TO BE VISIBLE
IN A PORTION OF A LATTICE
STRUCTURE
112

DETERMINE A FIRST ZONE IN A
DIGITAL MODEL OF THE LATTICE
STRUCTURE
114

PROCESSOR
102

DETERMINE A SECOND ZONE
OUTSIDE OF THE FIRST ZONE
116

ARRANGE SEEDS IN THE FIRST ZONE
118

ARRANGE SEEDS IN THE SECOND
ZONE
120

GROW CELLS FROM THE SEEDS
122

500

DETERMINE A FIRST ZONE
502

DETERMINE A SECOND ZONE
504

ARRANGE SEEDS IN THE FIRST ZONE
506

ARRANGE SEEDS IN THE SECOND ZONE
508

GROW THE SEEDS INTO CELLS
510

FORM THE DIGITAL MODEL OF THE LATTICE
STRUCTURE
512

COMPUTER-READABLE MEDIUM
600

DETERMINE A FIRST ZONE OF A DIGITAL MODEL OF A
LATTICE STRUCTURE
602

DETERMINE A SECOND ZONE IN THE DIGITAL MODEL
604

ARRANGE SEEDS IN THE FIRST ZONE
606

ARRANGE SEEDS IN THE SECOND ZONE
608

GROW THE SEEDS INTO CELLS
610

FORM THE DIGITAL MODEL TO INCLUDE THE
PREDEFINED PATTERN OF CELLS
612

LATTICE STRUCTURES WITH IDENTIFIABLE PATTERNS

CLAIM FOR PRIORITY

The present application is a national stage filing under 35 U.S.C 371 of PCT application number PCT/US2020/041037, having an international filing date of Jul. 7, 2020, the disclosure of which is hereby incorporated by reference in its entirety.

BACKGROUND

Lattice structures, such as a Voronoi or stochastic structures, may involve the random or semi-random placement of seeds around which cells are grown. The seeds may be placed along a planar surface or across a three-dimensional space. In addition, beams may be generated at the intersections of the cells to create a lattice structure that may fill a three-dimensional volume or may form along a two-dimensional surface. A three-dimensional fabrication system may also be employed to fabricate the lattice structure.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
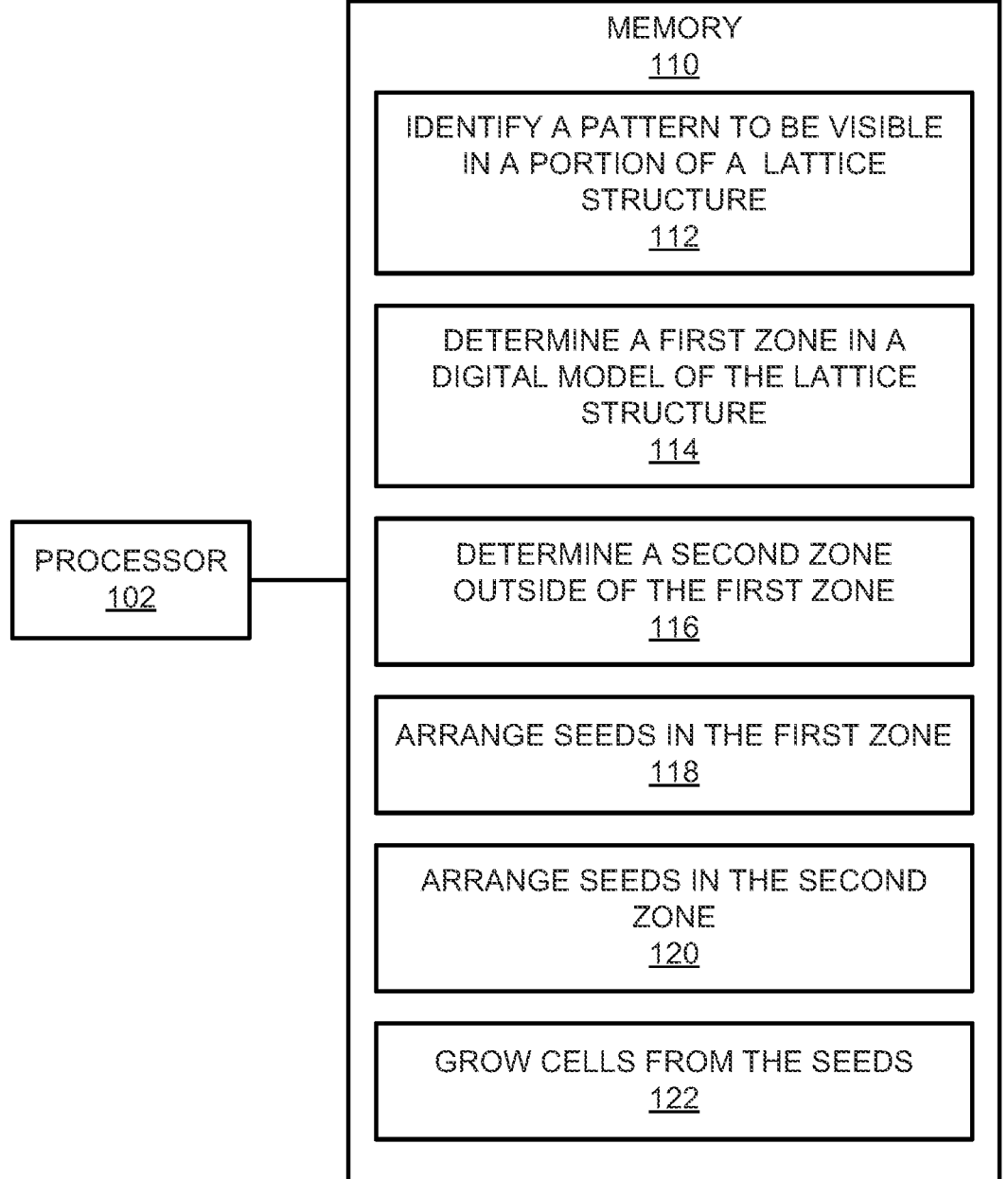
FIG. 1 shows a block diagram of an example apparatus that may grow cells of a lattice structure to cause an identified patter to be visible from the cells of the lattice structure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses and methods for generating lattice structures with an identifiable pattern as well as fabricating the lattice structures with the identifiable pattern. Particularly, the apparatuses disclosed herein may include a processor that may identify a pattern that is to be visible in a portion of a lattice structure and may determine a first zone in a digital model of the lattice structure corresponding to the identified pattern and a second zone corresponding to a location outside of the identified pattern, e.g., a border outside of the pattern. The processor may arrange a plurality of seeds at a first density in the first zone and a plurality of seeds at a second density in the second zone. In some examples, the first density level may be higher than the second density level to cause the pattern to appear darker than the location outside of the pattern. In other examples, however, the first density level may be lower than the second density level to cause the pattern to appear lighter than the location outside of the pattern.

The processor may also grow cells from the seeds to form the lattice structure in the digital model, in which the cells may grow from the seeds until edges of the cells contact edges of neighboring cells to form cells at a different density level in the first zone than the second zone. The difference density levels may result in the cells in the first zone having different sizes than the cells in the second zone. The difference in the sizes of the cells may result in the identified pattern being visible in the lattice structure.

According to examples, the lattice structure with the identified pattern may be fabricated using a 3D fabrication system. For instance, the processor may control fabrication components of a 3D fabrication system to fabricate the lattice structure based on identified locations of edges of the cells in the digital model of the lattice structure. The processor may also design an internal lattice structure separately from the lattice structure such that the internal lattice structure may have a different density, and thus, different properties, than the lattice structure. The processor may control the 3D fabrication system to fabricate the internal lattice structure together with or separately from the lattice structure.

Through implementation of the features of the present disclosure, a processor may form or modify a digital model of a lattice structure to include a predefined pattern from cells. The cells may be grown from seeds that may have been arranged at different density levels based on whether the seeds are located in a zone corresponding to the pattern or in a zone that is outside of the pattern. The present disclosure may enable the determination of properties of edges forming the lattice structure including the predefined pattern to be made in a computationally efficient manner, e.g., through the arrangement of seeds based on selected density levels and the growing of cells from the seeds. This manner of determining edge properties, e.g., locations, widths, etc., may be more computationally efficient than computing the edge properties in conventional manners. In addition, the design and fabrication of lattice structures may be beneficial over solid structures in that lattice structures may use less material, may be made to have certain strength and flexibility features, and/or the like.

Figures 2A, 2B, 2C:
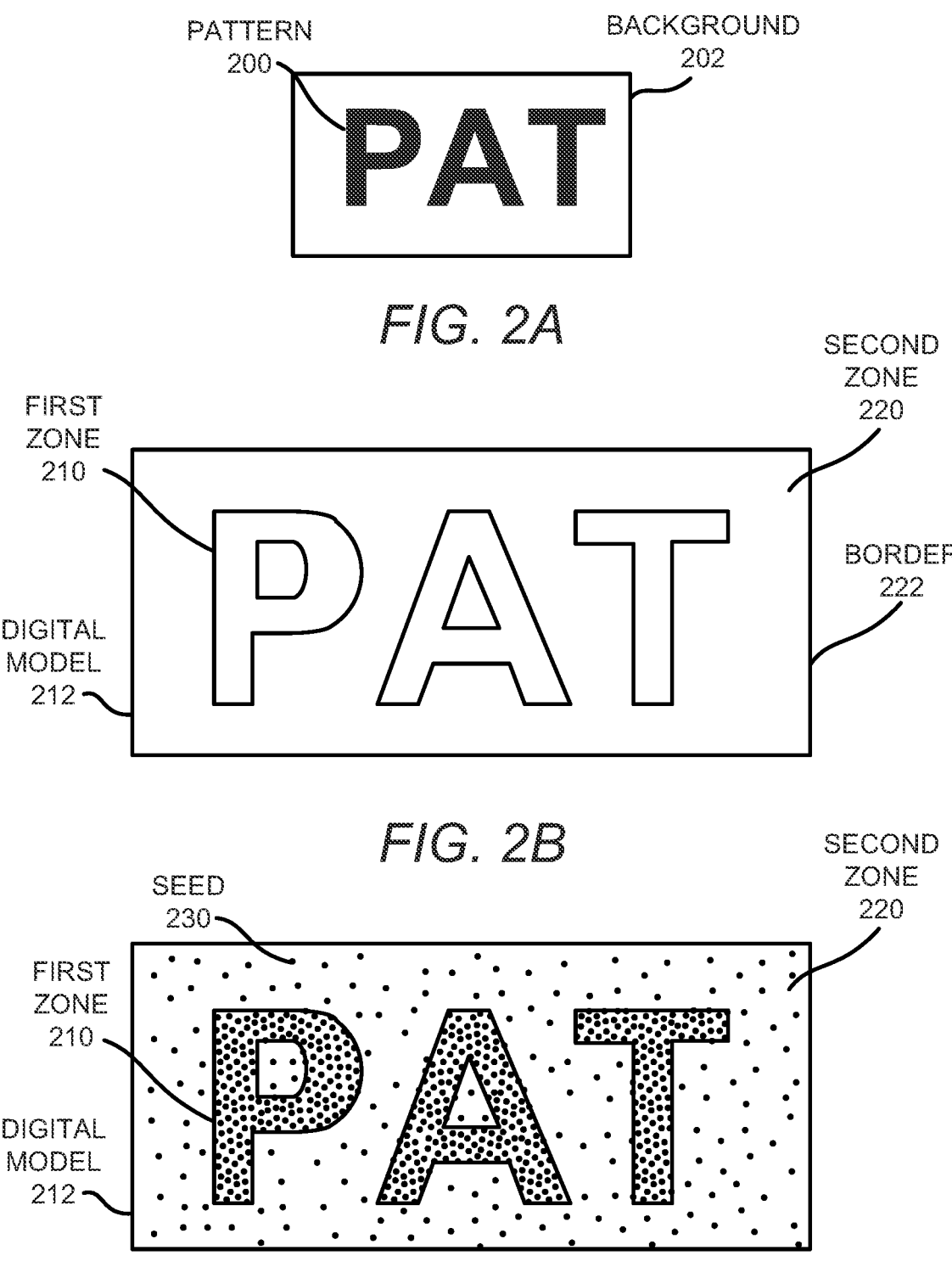
FIG. 2A shows a diagram of an example pattern and background that the apparatus shown in FIG. 1 may form or recreate in the lattice structure.
FIG. 2B shows a diagram of an example digital model of the lattice structure corresponding to the identified pattern shown in FIG. 2A.
FIG. 2C shows a diagram of the example digital model depicted in FIG. 2B with a plurality of seeds arranged in a first zone and a second zone of the digital model.
Figure 2D:
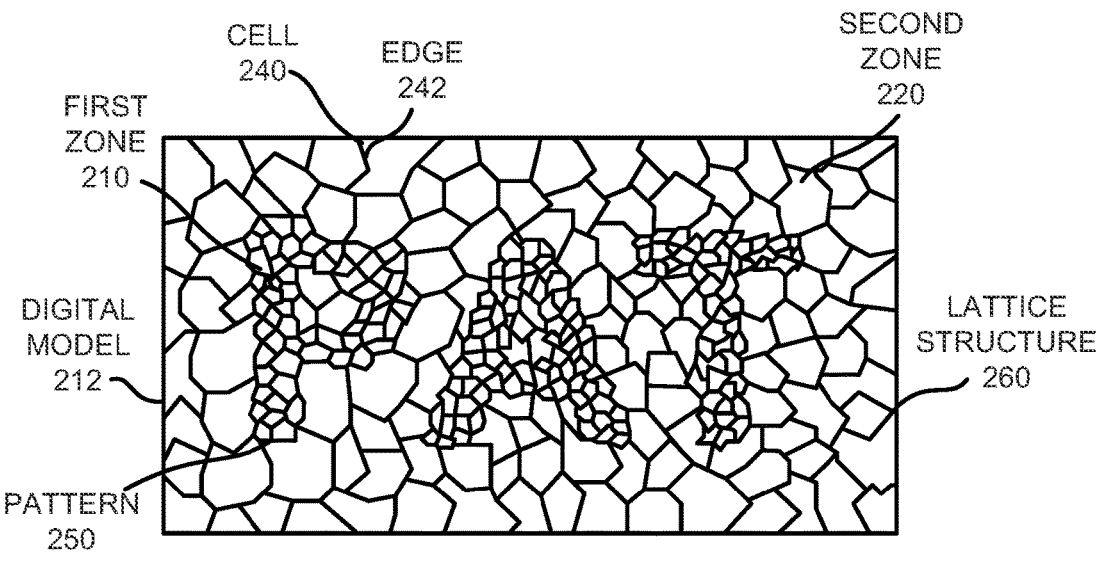
FIG. 2D shows a diagram of the example digital model depicted in FIG. 2C with a plurality of cells grown from the seeds an example lattice structure from the cells such that the identified pattern shown in FIG. 2A may be visible from the cells.

Reference is first made to FIGS. 1 and 2A-2D. FIG. 1 shows a block diagram of an example apparatus 100 that may grow cells 240 of a lattice structure 260 to cause an identified pattern 200 to be visible from the cells 240 of the lattice structure 260. FIG. 2A shows a diagram of an example pattern 200 and background 202 that the apparatus 100 may form or recreate in the lattice structure 260. FIG. 2B shows a diagram of an example digital model 212 of the lattice structure 260 corresponding to the identified pattern 200. FIG. 2C shows a diagram of the example digital model 212 depicted in FIG. 2B with a plurality of seeds 230 arranged in a first zone 210 and a second zone 220 of the digital model 212. FIG. 2D shows a diagram of the example digital model 212 depicted in FIG. 2C with a plurality of cells 240 grown from the seeds 230. FIG. 2D also shows an example lattice structure 260 from the cells 240 such that the identified pattern 200 from FIG. 2A may be visible from the cells 240. It should be understood that FIGS. 1-2D may include additional attributes and that some of the attributes described herein may be removed and/or modified without departing from the scopes of the features depicted in those figures.

The apparatus 100 may be a computing system such as a server, a laptop computer, a tablet computer, a desktop computer, a three-dimensional fabrication system, or the like. As shown, the apparatus 100 may include a processor 102, which may be a semiconductor-based microprocessor, a central processing unit (CPU), an application specific integrated circuit (ASIC), a field-programmable gate array (FPGA), and/or other suitable hardware device. The apparatus 100 may also include a memory 110 that may have stored thereon machine-readable instructions (which may also be termed computer-readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and multiple memories 110. In addition, or alternatively, the processor 102 and the memory 110 may be integrated into a single component, e.g., an integrated circuit on which both the processor 102 and the memory 110 may be provided.

As shown in FIG. 1, the memory 110 may have stored thereon machine-readable instructions 112-122 that the processor 102 may execute. Although the instructions 112-122 are described herein as being stored on the memory 110 and may thus include a set of machine-readable instructions, the apparatus 100 may include hardware logic blocks that may perform functions similar to the instructions 112-122. For instance, the processor 102 may include hardware components that may execute the instructions 112-122. In other examples, the apparatus 100 may include a combination of instructions and hardware logic blocks to implement or execute functions corresponding to the instructions 112-122. In any of these examples, the processor 102 may implement the hardware logic blocks and/or execute the instructions 112-122. As discussed herein, the apparatus 100 may also include additional instructions and/or hardware logic blocks such that the processor 102 may execute operations in addition to or in place of those discussed above with respect to FIG. 1.

The processor 102 may execute the instructions 112 to identify a portion of a pattern 200 (FIG. 2A) to be visible in a lattice structure 260 (FIG. 2D), in which the lattice structure is to be fabricated with the visible pattern 200. As shown in FIG. 2A, the pattern 200 may be a word, a logo, or the like. In other examples, the pattern 200 may be a symbol, a graphical design, data, information, and/or the like. Thus, although the pattern 200 has been depicted as having a certain sequence of letters, it should be understood that the pattern 200 may include other letters, a logo, symbols, and/or the like. In any regard, the pattern 200 depicted in FIG. 2A may have a feature, e.g., a color, a texture, a shading, and/or the like, that distinguishes the pattern 200 from a background 202 on which the pattern 200 may be contained and/or viewed. By way of particular example, the pattern 200 may have a dark color, e.g., black, and the background 202 may have a light color, e.g., white. In other examples, the pattern 200 may have a light color, e.g., white, gray, or the like, and the background may have a dark color, e.g., black, brown, dark gray, or the like.

The processor 102 may identify the pattern 200 through any suitable manner. For instance, a user may input the pattern 200 in digital form into the apparatus 100. As other examples, the processor 102 may access the pattern 200 in digital form from a local data store (not shown), from a data store via a network, and/or the like.

The processor 102 may execute the instructions 114 to determine a first zone 210 in a digital model 212 of the lattice structure corresponding to the identified pattern 200, for instance, as shown in FIG. 2B. The digital model 212 of the lattice structure may be a three-dimensional (3D) computer model of the lattice structure, such as a computer aided design (CAD) file, or other digital representation. In some examples, the digital model 212 may be generated using a CAD program, while in other examples, the digital model 212 may be generated using other types of programs. In any regard, the first zone 210 may have the same shape as the pattern 200, e.g., the first zone 210 may have outlines that may match the shapes and locations of each of the letters in the pattern 200.

The processor 102 may execute the instructions 116 to determine a second zone 220 in the digital model 212 of the lattice structure corresponding to a location outside of the first zone 210. The second zone 220 may include the area outside of the first zone 210 to a border 222 around the first zone 210 as well as spaces inside of the first zone 210. For instance, the second zone 220 may include the spaces inside the letters "P" and "A." The border 222 may extend a certain distance from the first zone 210, in which the certain distance may be equivalent to edges of the lattice structure or some other distance. The border 222 may have linear edges as shown in FIG. 2B or may have other shapes.

The processor 102 may execute the instructions 118 to arrange a plurality of seeds 230 (FIG. 2C) at a first density level in the first zone 210. The processor 102 may also execute the instructions 120 to arrange a plurality of seeds 230 at a second density level in the second zone 220. This may include arranging seeds 230 inside of open spaces within the first zone 210, e.g., white spaces inside of letters, objects, or the like. As shown in FIG. 2C, the first density level may be higher than the second density level. That is, the seeds 230 in the first zone 210 may be more densely packed with respect to each other than the seeds 230 in the second zone 220. In other examples, however, the seeds 230 in the second zone 220 may be more densely packed with respect to each other than the seeds 230 in the first zone 210.

According to examples, the processor 102 may randomly arrange the seeds 230 at the first density level in the first zone 210 and may also randomly arrange the seeds 230 at the second density level in the second zone 220. That is, for instance, the processor 102 may randomly select positions for the seeds in the first zone 210 and the second zone 220 that results in the respective density levels or close to the respective density levels.

In some examples, the processor 102 determine another zone, e.g., an intermediate zone (not shown), for which seeds 230 may be arranged at a third density level that differs from the first density level and the second density level. For instance, the third density level may be between the first density level and the second density level, may be greater than both the first density level and the second density level, or may be lower than both the first density level and the second density level. By way of particular example, the intermediate zone may be positioned at an interface between the first zone 210 and the second zone 220 and the third density level may be between the first density level and the second density level to thus cause a graduated transition between the first zone 210 and the second zone 220. Additional intermediate zones having other density levels may alternatively be positioned at the interface to cause a more graduated transition between the first zone 210 and the second zone 220.

The processor 102 may execute the instructions 122 to grow cells 240 (FIG. 2D) from the plurality of seeds 230 to form the lattice structure in the digital model 212 such that the identified pattern 200 is visible from the cells 240 in the lattice structure. Particularly, the processor 102 may grow each of the seeds 230 as spheres (or other suitable shapes, e.g., ellipsoids, circles, or the like) until edges 242 of the cells 240 contact edges 242 of neighboring cells 240. As the seeds 230 may have been arranged randomly, the edges 242 of the cells 240 may contact the edges 242 of the neighboring cells 240 randomly. That is, one edge 242 of a cell 240 may contact an edge 242 of a neighboring cell 240 earlier than another edge 242 of the cell 240, which may cause the cell 240 to have different distances between the location of the seed 230 in the cell 240 and the edges 242 of the cell 240. According to examples, the processor 102 may employ any suitable technique for growing cells 240 from seeds 230, such as sphere packing.

In addition, as the seeds 230 in the first zone 210 may have been arranged at a different density level than the seeds 230 in the second zone 220, the cells 240 in the first zone 210 be arranged at a different density level than the cells 240 in the second zone 220. For instance, as shown in FIG. 2D, the cells 240 in the first zone 210 have been arranged at a higher density level than the cells 240 in the second zone 220. In other examples, however, the cells 240 in the first zone 210 may be arranged at a lower density level than the cells 240 in the second zone 220. In any regard, the processor 102 may grow each of the seeds 230 at a common rate such that the cells 240 in the first zone 210 may be arranged at a different density level than the cells 240 in the second zone 220. As shown in FIG. 2D, the different density levels of the cells 240 may result in a pattern 250 being visible in the digital model 212 of the lattice structure that matches the pattern 200 shown in FIG. 2A.

Figure 3:
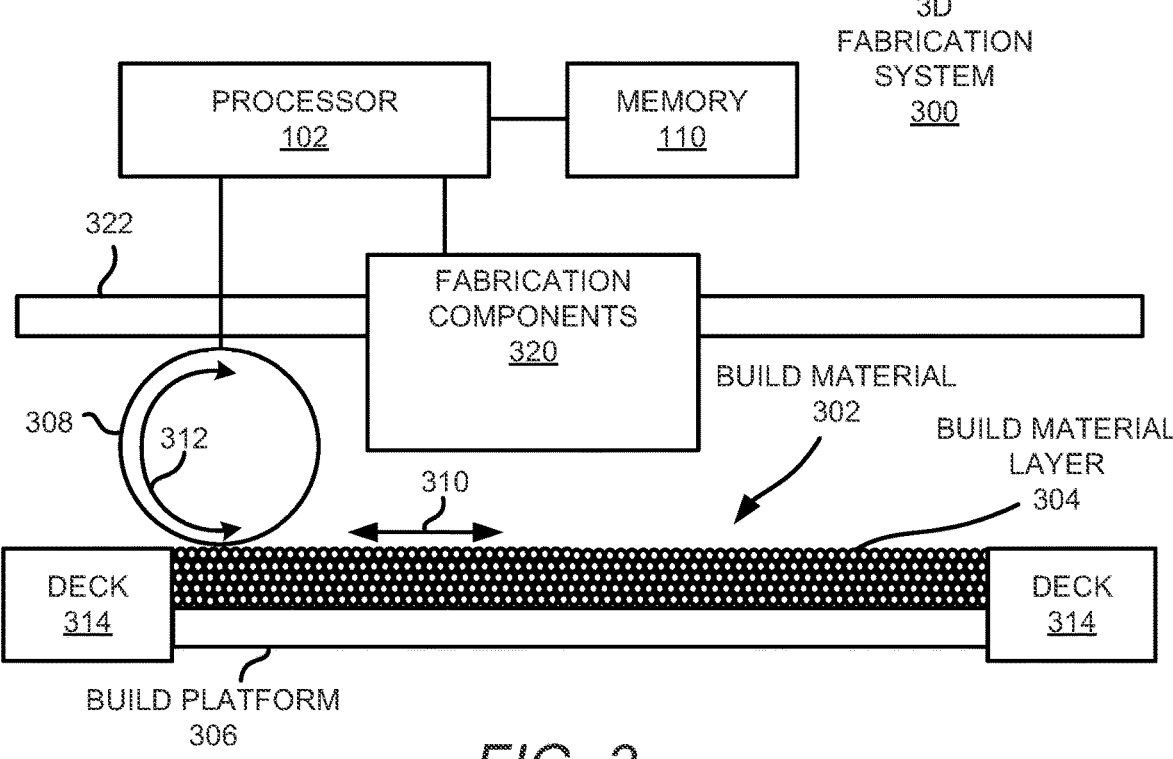
FIG. 3 shows a block diagram of an example 3D fabrication system that may include the processor of the example apparatus depicted in FIG. 1.

In some examples, the processor 102 may be external to a three-dimensional (3D) fabrication system 300 and may control the 3D fabrication system 300. In other examples, the processor 102 may be part of a three-dimensional (3D) fabrication system 300, for instance, a control system of the 3D fabrication system as shown in FIG. 3. Particularly, FIG. 3 shows a block diagram of an example 3D fabrication system 300 that may include the processor 102 of the example apparatus 100 depicted in FIG. 1. It should be understood that the example 3D fabrication system 300 depicted in FIG. 3 may include additional features and that some of the features described herein may be removed and/or modified without departing from the scope of the 3D fabrication system 300. In addition, although the 3D fabrication system 300 is described as a particular type of 3D fabrication system, it should be understood that the processor 102 may be part of any other type of 3D fabrication system, such as a system that uses selective laser sintering, selective laser melting, or the like.

The 3D fabrication system 300 may also be termed a 3D printing system, a 3D fabricator, or the like, and may be implemented to fabricate 3D objects through selective binding and/or solidifying of build material 302, which may also be termed build material particles, together. The build material 302 may be formed into a build material layer 304 on a build platform 306 during fabrication of a 3D object, e.g., a lattice structure 260. The build material 302 may include, for instance, a polymer, a plastic, a ceramic, a nylon, a metal, combinations thereof, or the like, and may be in the form of a powder or a powder-like material.

As shown, the 3D fabrication system 300 may include a recoater 308, which may spread, deposit, or otherwise form the build material 302 into a build material layer 304 as the recoater 308 is moved, e.g., scanned, across the build platform 306 as indicated by the arrow 310 and rotated as indicated by the arrow 312. According to examples, the build platform 306 may provide a build area for the build material 302 to be spread into successive layers 304 of build material 302. The build platform 306 may be downwardly movable during formation of successive build material layers 304. The 3D fabrication system 300 may also include decks 314 from which build material 302 may be supplied for formation into build material layers 304.

According to examples, the processor 102 may control fabrication components 320 of the 3D fabrication system 300 to fabricate a lattice structure 260 based on the identified locations of the edges 242 of the cells 240 in the digital model 212 of the lattice structure 260. In some examples, the fabrication components 320 may include an agent delivery device that the processor 102 may control to deliver an agent onto the build material layer 304. For instance, the processor 102 may control the agent delivery device to deliver an agent onto the selected locations of the build material layer 304 that are to be bound/fused together. The fabrication components 320 may also or alternatively include an energy source that may output energy onto the build material layer 304. In any regard, the fabrication components 320 may be supported on a carriage that may move with or across a mechanism 322, which may include an actuator, a belt, and/or the like that may cause the carriage to be moved.

In any regard, the processor 102 may control the fabrication components 320 to fabricate the lattice structure 260 to include edges that correspond to the edges 242 of cells 240 as shown in FIG. 2D. In some examples, prior to fabrication of the lattice structure 260 (e.g., the lattice structure corresponding to the lattice structure in the digital model 212), the processor 102 may increase the widths of the edges 242. Particularly, for instance, the processor 102 may add closed cylindrical surfaces around each of the edges 242 such that the lattice structure 260 may include edges 242 that have intended thicknesses. In addition, the processor 102 may control the fabrication components 320 to fabricate the lattice structure 260 with the edges 242 having the increased widths. Thus, although the lattice structure 260 is depicted in two-dimensional form, it should be understood that the lattice structure 260 may be a 3D structure and may thus have depth and/or thickness.

Figure 4:
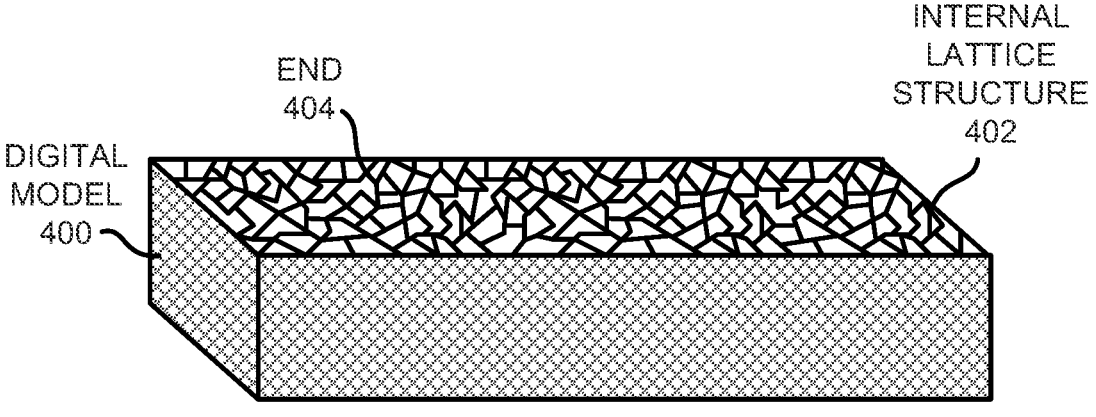
FIG. 4 shows an isometric view of an internal lattice structure that may provide support for the lattice structure shown in FIG. 2D.

According to examples, the processor 102 may generate a digital model 400 (FIG. 4) of an internal lattice structure 402 that is to provide support for the lattice structure 260. As shown in FIG. 4, the internal lattice structure 402 may be a 3D part having a plurality of lattice elements having ends 404. The processor 102 may generate the digital model 400 of the internal lattice structure 402 through the growth of seeds arranged in 3D space and may grow the seeds in three dimensions. The seeds may be arranged at a different density level than either or both of the density levels at which the seeds 230 are arranged in the first zone 210 and the second zone 220. The density at which the seeds may be arranged may be based on an intended stiffness, rigidity, flexibility, or the like, of the internal lattice structure 402. In addition, the processor 102 may generate the digital model 400 of the internal lattice structure 402 separately from the digital model 212 of the lattice structure 260 such that, for instance, the internal lattice structure 402 may have a different density than the lattice structure 260.

Although the lattice structure 260 and the internal lattice structure 402 are depicted as having flat surfaces, it should be understood that the lattice structure 260 and the internal lattice structure 402 may have curved surfaces. By way of example, the lattice structure 260 and the internal lattice structure 402 may have spherical shapes, cylindrical shapes, contours, waves, steps, and/or the like.

As the digital model 400 of the internal lattice structure 402 may be generated separately from the digital model 212 of the lattice structure 260, the ends 404 of the internal lattice structure 402 may not match up with the edges 242 of the lattice structure 260. According to examples, the processor 102 may join the ends 404 of the digital model 400 of the internal lattice structure 402 with features of the digital model 212 of the lattice structure 260. That is, for instance, the processor 102 may move the ends 404 such that the ends 404 join the edges 242 and/or the intersections of the edges 242 of the lattice structure 260. In addition, the processor 102 may control the fabrication components 320 to fabricate the internal lattice structure 402 concurrently with the lattice structure 260 such that the internal lattice structure 402 and the lattice structure 260 may be fabricated as an integrated component. In other examples, the processor 102 may control the fabrication components 320 to fabricate the internal lattice structure 402 separately from the lattice structure 260 and the internal lattice structure 402 may be joined to the lattice structure 260 following the fabrication of the lattice structures 402, 260.

Figure 5:
FIG. 5 shows a flow diagram of an example method for forming a digital model of a lattice structure to include a predefined pattern.
Figure 5:
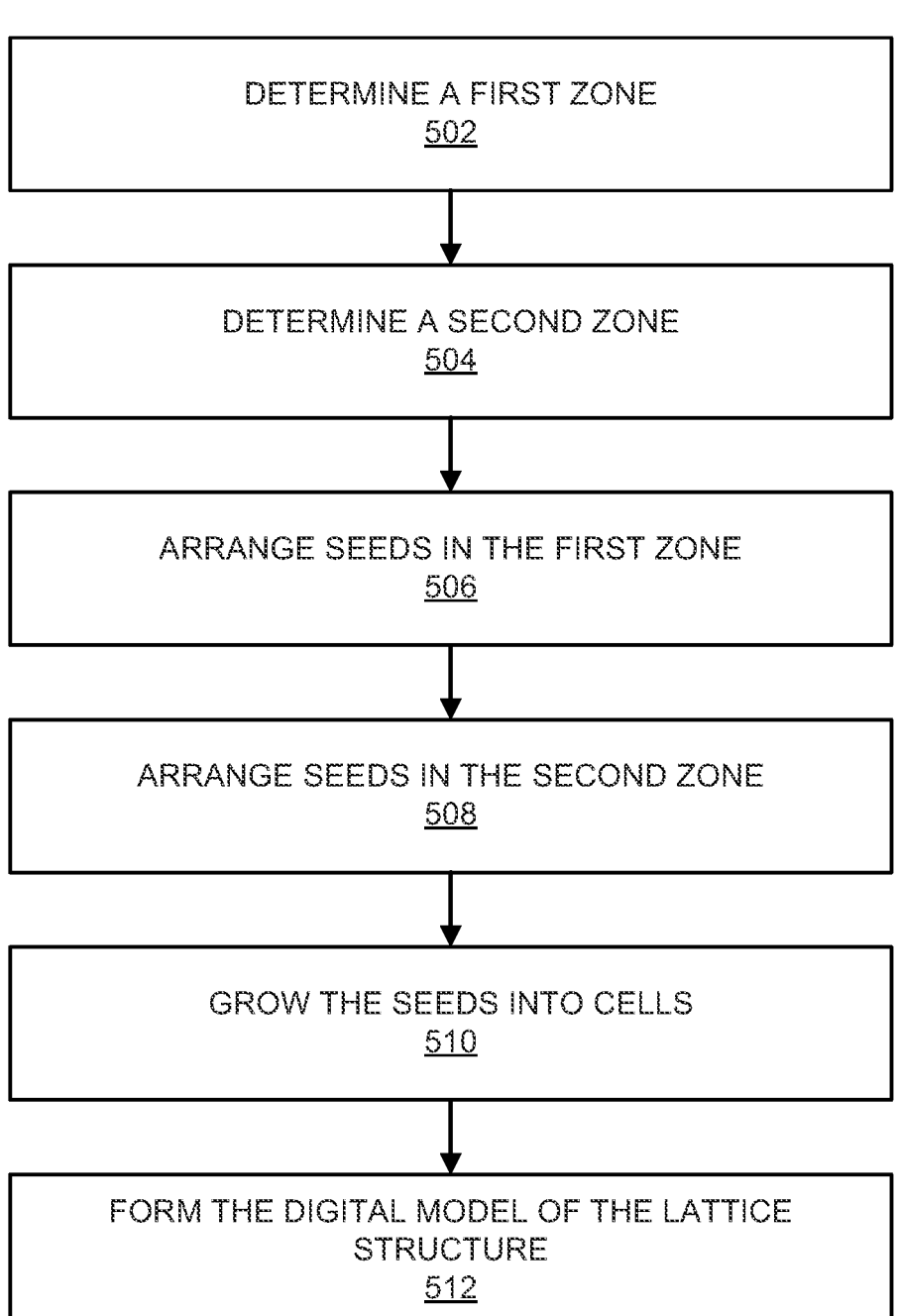

Turning now to FIG. 5, there is shown a flow diagram of an example method 500 for forming a digital model 212 of a lattice structure 260 to include a predefined pattern 250. It should be understood that the method 500 depicted in FIG. 5 may include additional operations and that some of the operations described therein may be removed and/or modified without departing from the scope of the method 500.

The description of the method 500 is also made with reference to the features depicted in FIGS. 1-4 for purposes of illustration.

At block 502, the processor 102 may determine a first zone 210 in a digital model 212 of a lattice structure 260 at which a predefined pattern 200 is to be formed. At block 504, the processor 102 may determine a second zone 220 in the digital model 212 of the lattice structure 260 corresponding to a location adjacent to the first zone 210. At block 506, the processor 102 may arrange a plurality of seeds 230 at a first density level in the first zone 210, for instance, as shown in FIG. 2C. As also shown in FIG. 2C, at block 508, the processor 102 may arrange a plurality of seeds 230 at a second density level in the second zone 220. As discussed herein, the processor 102 may arrange the seeds 230 randomly and at the respective density levels.

At block 510, the processor 102 may grow the plurality of seeds 230 into cells 240 having edges 242 that contact edges 242 of neighboring cells 240. As shown in FIG. 2D, the cells 240 in the first zone 210 may be arranged at a different density level than the cells 240 in the second zone 220. In addition, at block 512, the processor 102 may form, or equivalently, modify, the digital model 212 of the lattice structure 260 to include the predefined pattern 250 from the cells 240, for instance, as shown in FIG. 2D.

As discussed herein with respect to FIG. 3, the processor 102 may also control fabrication components 320 of a 3D fabrication system 300 to fabricate the lattice structure 260 with the predefined pattern. In some examples, the processor 102 may increase widths of the edges 242 of the cells 240 and may control the fabrication components 320 to fabricate the lattice structure 260 with the increased widths of the edges 242.

As also discussed herein, the processor 102 may generate a digital model 400 of an internal lattice structure 402 separately from the digital model 212 of the lattice structure 260. The digital model 400 of the internal lattice structure 402 may have ends 404, in which the internal lattice structure 402 is to internally support the lattice structure 260. The processor 102 may also join the ends 404 of the digital model 400 of the internal lattice structure 402 with structures of the digital model 212 of the lattice structure 260 to tie the internal lattice structure 402 to the lattice structure 260. The processor 102 may further control the fabrication components 320 to fabricate the internal lattice structure 402 and the lattice structure 260 as a single component.

Some or all of the operations set forth in the method 500 may be contained as utilities, programs, or subprograms, in any desired computer accessible medium. In addition, the method 500 may be embodied by computer programs, which may exist in a variety of forms. For example, the method 500 may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 6:
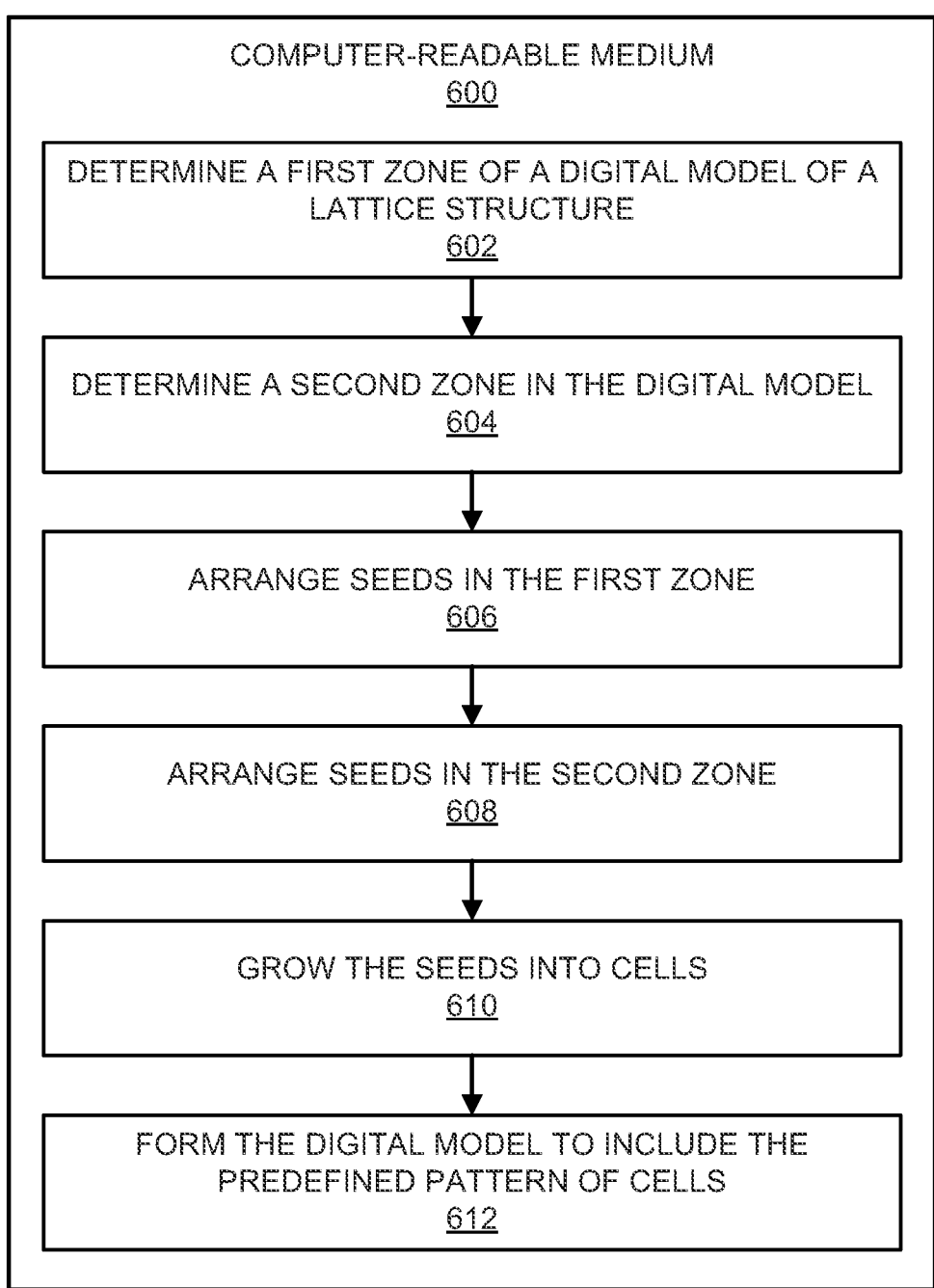
FIG. 6 shows a block diagram of a computer-readable medium that may have stored thereon computer-readable instructions for forming a digital model of a lattice structure to include a predefined pattern.

Turning now to FIG. 6, there is shown a block diagram of a computer-readable medium 600 that may have stored thereon computer-readable instructions for forming a digital model 212 of a lattice structure 260 to include a predefined pattern 200. It should be understood that the computer-readable medium 600 depicted in FIG. 6 may include additional instructions and that some of the instructions described herein may be removed and/or modified without departing from the scope of the computer-readable medium 600 disclosed herein. The computer-readable medium 600 may be a non-transitory computer-readable medium, in which the term "non-transitory" does not encompass transitory propagating signals.

The computer-readable medium 600 may have stored thereon machine-readable instructions 602-612 that a processor, such as the processor 102 depicted in FIG. 1, may execute. The computer-readable medium 600 may be an electronic, magnetic, optical, or other physical storage device that contains or stores executable instructions. The computer-readable medium 600 may be, for example, Random Access memory (RAM), an Electrically Erasable Programmable Read-Only Memory (EEPROM), a storage device, an optical disc, and the like.

The processor may fetch, decode, and execute the instructions 602 to determine a first zone 210 in a digital model 212 of a lattice structure 260 at which a predefined pattern 200 is to be formed. The processor may fetch, decode, and execute the instructions 604 to determine a second zone 220 in the digital model 212 of the lattice structure 260 corresponding to a location adjacent to the first zone 210. The processor may fetch, decode, and execute the instructions 606 to the processor 102 may arrange a plurality of seeds 230 at a first density level in the first zone 210, for instance, as shown in FIG. 2C. The processor may fetch, decode, and execute the instructions 608 to arrange a plurality of seeds 230 at a second density level in the second zone 220. The processor may fetch, decode, and execute the instructions 610 to grow the plurality of seeds 230 into cells 240 having edges 242 that contact edges 242 of neighboring cells 240. The processor may fetch, decode, and execute the instructions 612 to form, or equivalently, modify, the digital model 212 of the lattice structure 260 to include the predefined pattern 250 from the cells 240, for instance, as shown in FIG. 2D.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims— and their equivalents—in which all terms are meant in their broadest reasonable sense unless otherwise indicated.

What is claimed is:

1. An apparatus comprising:

a processor; and a memory on which is stored machine-readable instructions that are to cause the processor to:

identify, within a portion of a lattice structure comprising an external surface of an object to be manufactured, an information-conveying pattern to remain visible at the external surface of the object when completely manufactured;

determine a first zone in a digital model of the lattice structure corresponding to the identified information-conveying pattern;

determine a second zone in the digital model of the lattice structure corresponding to a location outside of the first zone;

arrange a plurality of seeds at a first density level in the first zone;

arrange a plurality of seeds at a second density level in the second zone;

grow cells from the plurality of seeds to form the lattice structure in the digital model, wherein the cells grow until edges of the cells contact edges of neighboring cells to form cells at a different density level in the first zone than the second zone to cause the identified information-conveying pattern to be visible from the cells; and control fabrication components of a three-dimensional fabrication system to fabricate the object, including the lattice structure based on identified locations of the edges of the cells in the digital model of the lattice structure.

2. The apparatus of claim 1, wherein the instructions are to cause the processor to:

increase widths of the edges; and control the fabrication components to fabricate the lattice structure with the increased widths.

3. The apparatus of claim 1, wherein the instructions are to cause the processor to:

generate a digital model of an internal lattice structure separately from the digital model of the lattice structure, the digital model of the internal lattice structure having ends, wherein the internal lattice structure is to internally support the lattice structure; and join the ends of the digital model of the internal lattice structure with features of the digital model of the lattice structure.

4. The apparatus of claim 3, wherein the instructions are to cause the processor to:

generate the digital model of the internal lattice structure to have a different density level than the digital model of the lattice structure.

5. The apparatus of claim 1, wherein the first density level is higher than the second density level and wherein the instructions are further to cause the processor to:

grow each of the plurality of seeds at a common rate to cause the cells in the first zone to be smaller than the cells in the second zone.

6. The apparatus of claim 1, wherein the instructions are further to cause the processor to:

randomly arrange the plurality of seeds at the first density level in the first zone; and randomly arrange the plurality of seeds at a second density level in the second zone.

7. The apparatus of claim 1, wherein the instructions are further to cause the processor to:

determine an intermediate zone between the first zone and the second zone; and arrange a plurality of seeds at a third density level in the intermediate zone, the third density level being between the first density level and the second density level.

8. A method comprising:

determining, by a processor, a first zone in a digital model of a lattice structure at which a predefined information-conveying pattern is to be formed within a portion of the lattice structure comprising an external surface of an object and is to remain visible at the external surface of the object when completely manufactured;

determining, by the processor, a second zone in the digital model of the lattice structure corresponding to a location adjacent to the first zone;

arranging, by the processor, a plurality of seeds at a first density level in the first zone;

arranging, by the processor, a plurality of seeds at a second density level in the second zone;

growing, by the processor, the plurality of seeds into cells having edges that contact edges of neighboring cells, wherein the cells in the first zone are arranged at a different density level than the cells in the second zone;

forming, by the processor, the digital model of the lattice structure to include the predefined information-conveying pattern from the cells;

controlling fabrication components of a three-dimensional fabrication system to fabricate the object, including the lattice structure with the predefined information-conveying pattern.

9. The method of claim 8, further comprising:

increasing widths of the edges of the cells; and controlling the fabrication components to fabricate the lattice structure with the increased widths of the edges.

10. The method of claim 8, further comprising:

generating a digital model of an internal lattice structure separately from the digital model of the lattice structure, the digital model of the internal lattice structure having ends, wherein the internal lattice structure is to internally support the lattice structure; and joining the ends of the digital model of the internal lattice structure with structures of the digital model of the lattice structure to tie the internal lattice structure to the lattice structure.

11. The method of claim 8, further comprising:

randomly arranging the plurality of seeds at the first density level in the first zone; and randomly arranging the plurality of seeds at a second density level in the second zone.

12. A physical object comprising:

an external surface;

a lattice structure comprising the external surface of the physical object;

a first set of zones comprising a first lattice structure of the lattice structure, the first lattice structure formed of cells generated from seeds randomly arranged at a first density level, wherein the first set of zones correspond to information-conveying content that is visible at the external surface; and a second set of zones comprising a second lattice structure of the lattice structure, the second lattice structure formed of cells generated from seeds randomly arranged at a second density level, wherein the cells forming the first lattice structure are arranged at a different density level than the cells forming the second lattice structure.

13. The physical object of claim 12, further comprising:

an internal lattice structure, wherein the internal lattice structure has a different density level than the first lattice structure and the second lattice structure, and wherein the internal lattice structure has ends that are connected to structures of the first lattice structure and the second lattice structure.

\* \* \* \* \*